(12) United States Patent
Sobek

(10) Patent No.: US 10,929,824 B2
(45) Date of Patent: Feb. 23, 2021

(54) SYSTEMS AND METHODS FOR TRANSFERRING FUNDS IN REAL TIME

(71) Applicant: MOBILE CAPITAL GROUP, INC., Prairie Village, KS (US)

(72) Inventor: Michael Sobek, Leawood, KS (US)

(73) Assignee: Mobile Capital Group, Inc, Leawood, KS (US)

( * ) Notice: Subject to any disclaimer, the term of this patent is extended or adjusted under 35 U.S.C. 154(b) by 555 days.

(21) Appl. No.: 15/001,209

(22) Filed: Jan. 19, 2016

(65) Prior Publication Data

US 2016/0210600 A1    Jul. 21, 2016

Related U.S. Application Data

(60) Provisional application No. 62/105,124, filed on Jan. 19, 2015.

(51) Int. Cl.
*G06Q 20/10* (2012.01)
*G06Q 20/02* (2012.01)

(52) U.S. Cl.
CPC ......... *G06Q 20/108* (2013.01); *G06Q 20/027* (2013.01); *G06Q 20/10* (2013.01)

(58) Field of Classification Search
CPC .................................................. G06Q 20/108
USPC ......................................................... 705/44
See application file for complete search history.

(56) References Cited

U.S. PATENT DOCUMENTS

| 7,912,784 B2 | 3/2011 | Sobek |
| 8,862,504 B2 | 10/2014 | Sobek |
| 9,294,497 B1* | 3/2016 | Ben-Or ............... H04L 63/1433 |
| 2012/0005072 A1* | 1/2012 | Ahlers ................... G06Q 20/10 705/38 |
| 2012/0191594 A1* | 7/2012 | Welch .................... G06Q 40/02 705/38 |
| 2014/0214670 A1* | 7/2014 | McKenna .......... G06Q 20/4014 705/44 |
| 2015/0347990 A1* | 12/2015 | Cobbs .................... G06Q 20/10 705/39 |
| 2015/0379632 A1* | 12/2015 | Michael ............... G06Q 40/025 705/14.73 |

OTHER PUBLICATIONS

Driving Debit Card Volume (Year: 2014).*

* cited by examiner

*Primary Examiner* — Bruce I Ebersman
(74) *Attorney, Agent, or Firm* — Troutman Pepper Hamilton Sanders LLP

(57) ABSTRACT

An apparatus is disclosed which includes a processor and non-transient memory operatively connected to the processor. The memory includes instructions which, when executed by the processor, cause the processor to: receive, from a server hosting a managed services gateway, an authorized funding amount which is based on user account data associated with the user account; transmit a funds transfer request to the server, where the funds transfer request includes a funding amount less than or equal to the authorized funding amount; transmit a funds-transfer confirmation message to the server which causes the managed services gateway to initiate an internal funds transfer on a bank server associated with the user account. The internal funds transfer comprises a real-time transfer of funds from a managed services account owned by a managed services provider to a consumer account associated with the user maintained with the same bank.

11 Claims, 15 Drawing Sheets

SYSTEMS AND METHODS FOR TRANSFERRING FUNDS IN REAL TIME

CROSS-REFERENCE TO RELATED APPLICATIONS AND PRIORITY CLAIM

This application claims the benefit of U.S. Provisional Patent Application No. 62/105,124 filed Jan. 19, 2015 and entitled "Systems and Methods For Account Processing, Risk Analysis, And Trust Services Of A Mobile Lending Network."

FIELD

The disclosure relates generally to the electronic transfer of money. More specifically, the disclosure relates issuing credit lines and electronically transferring money in real time.

BACKGROUND

Millions of consumers need short-term, small dollar credit to help pay for retail transactions such as unexpected car repairs or healthcare expenses and lack the means to borrow these funds on demand. Presently available solutions for these consumers may charge fees and interest rates exceeding 700% per annum, leaving the consumer facing long term damage to her credit scores and financial status. Financial institutions and alternative lenders fund approximately $25 trillion at any given time. In parallel, physical and virtual prepaid, debit, and credit card programs are estimated increase in circulation to approximately 20 billion accounts by the year 2017.

Traditional lenders include, for example, banks, credit unions, savings and loans, and some less-regulated, state approved alternative lenders. These regulated financial institutions have not invested in technology to lower product and operations costs via automation and electronic delivery of lending services. Less regulated, more flexible lenders are frequently driven out of business because of predatory lending practices. This deprives consumer of viable lenders for small, quick loans.

Over the past several years, most financial institutions have adopted and deployed some form of internet banking services. These services enabling their customers to securely login and review account status and history, transfer funds between accounts, and possibly pay bills and credit card accounts. However, financial institutions have typically transferred only a subset of their existing internet banking services to mobile devices. Further, the highly flexible, integrated architectures developed across the Internet using application programming interfaces (APIs) and messages that are simply shared via Representational State Transfer (REST) objects and endpoints are becoming the norm for new mobile applications.

Financial institutions rely heavily upon the Federal Reserve's Automated Clearing House (ACH) bank networks to transfer funds between institutions. Moving funds via the legacy ACH network requires a one to three day delay before funds are deposited into the consumer's account for use. The ACH system and its associated rules and regulations have not adopted real-time transaction processing technologies using mobile platforms. Further, banks and credit unions are motivated to avoid moving funds in real time because they receive interest payments for funds that reside on their books during the one to three day transfers.

The legacy FICO scoring system for evaluating credit risk of consumers is also problematic. Credit scores are often reduced by one-time events related to poor economic conditions or substantial health care bills. Evaluation criteria are limited to performance with known creditors and single events may appear for several years in the history of a consumer. In addition, the FICO system is only updated once a month and may not represent the current state of a consumer's financial or employment status. The FICO system lacks real-time access to key employer information about a consumer which could enhance the security and reduce the risk of issuing credit.

DETAILED DESCRIPTION

Figure 1:
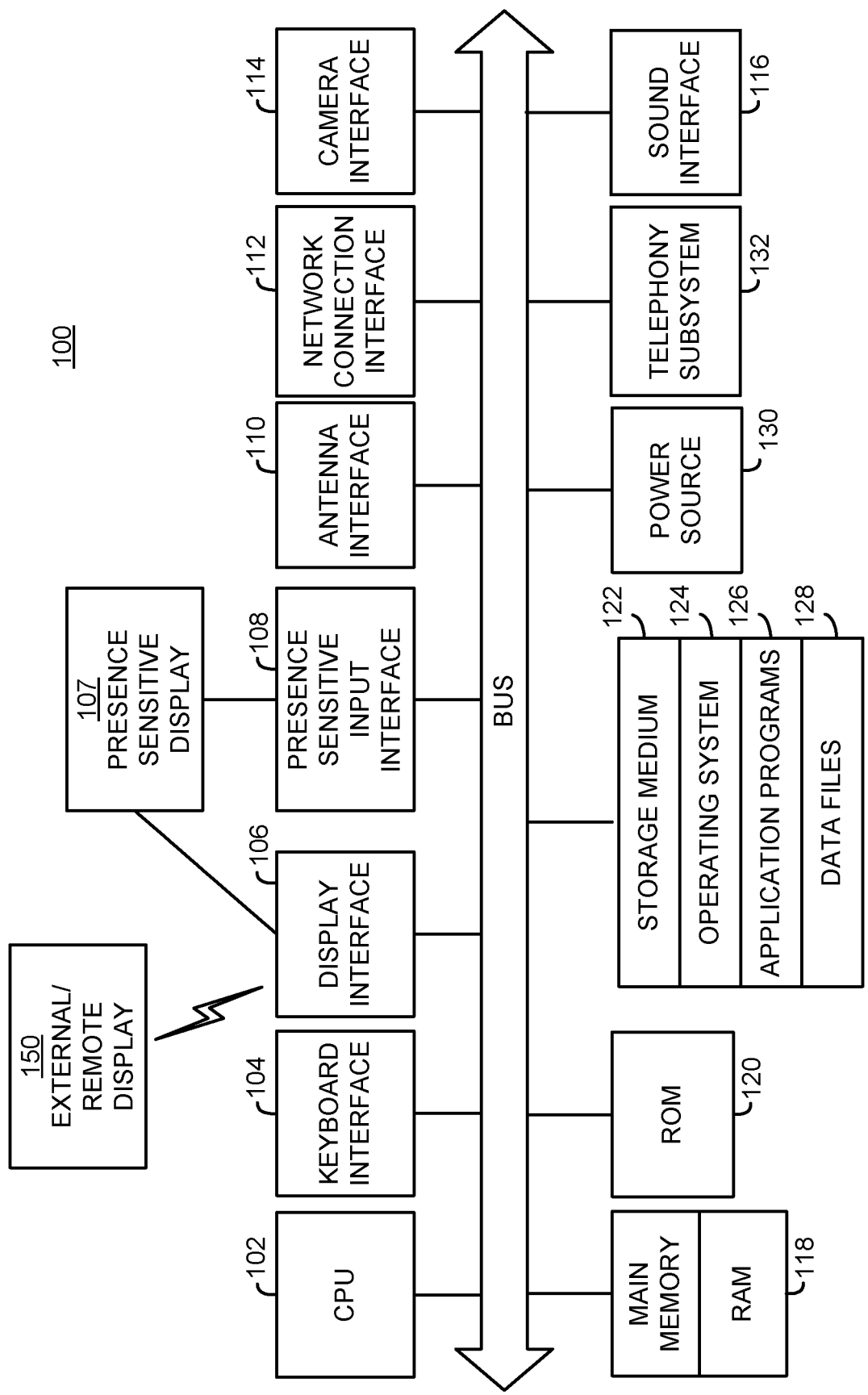
FIG. 1 is a block diagram of a computing device illustrating the function relations between its components, in accordance with the present disclosure.

Referring now to the Figures, in which like reference numerals represent like parts, various implementations of the computing devices and methods will be disclosed in detail. FIG. 1 is a block diagram illustrating one example of a computing device 100 suitable for use with the disclosed systems and methods for transferring funds in real time.

FIG. 1 depicts a block diagram of an illustrative computing device architecture 100, according to an example implementation. As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a CPU 102, where computer instructions are processed; a display interface 106 that acts as a communication interface and provides functions for rendering video, graphics, images, and texts on the display. According to some implementations of the disclosed technology, the display interface 106 may be directly connected to a local display, such as a touch-screen display associated with a mobile computing device. In another example implementation, the display interface 106 may be configured for providing data, images, and other information for an external/remote display that is not necessarily physically connected to the mobile computing device. For example, a desktop monitor may be utilized for mirroring graphics and other information that is presented on a mobile computing device. According to certain some implementations, the display interface 106 may wirelessly communicate, for example, via a Wi-Fi channel, Bluetooth, or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 104 that provides a communication interface to a keyboard. In one example implementation, the computing device architecture 100 may include a presence-sensitive display interface 107 for connecting to a presence-sensitive display. According to certain some implementations of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 104, the display interface 106, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. According to certain implementations, a camera interface 114 is provided that acts as a communication interface and provides functions for capturing digital images from a camera. According to certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components. According to an example implementation, the computing device architecture 100 includes a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system, application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device may be coupled, connected, and/or in communication with one or more peripheral devices, such as a display. In another example implementation, the term computing device, as used herein, may refer to a mobile computing device such as a smartphone or tablet computer. In this example implementation, the computing device may output content to its local display and/or speaker(s). In another example implementation, the computing device may output content to an external display device (e.g., over Wi-Fi) such as a TV or an external computing system.

In some implementations of the disclosed technology, the computing device may include any number of hardware and/or software applications that are executed to facilitate any of the operations. In some implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2:
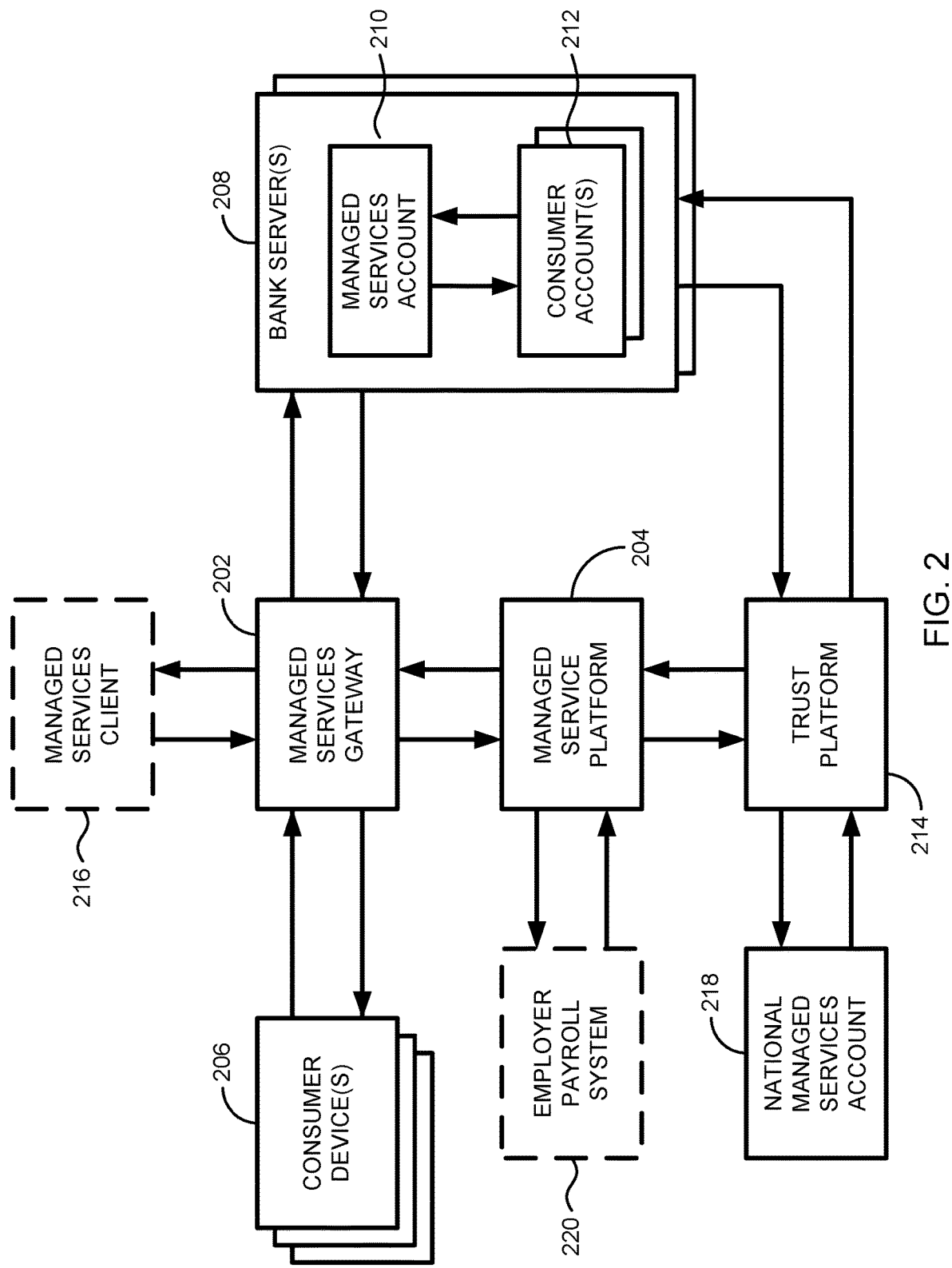
FIG. 2 is a block diagram of a system for account registration, requesting and approving credit lines, and transferring funds via real time deposits into a bank account or the instant issuance or reload of a virtual bank card which illustrates the general functional relations between its components, in accordance with the present disclosure.

FIG. 2 depicts a system for account processing, risk analysis, and trust services of a non-conventional lending and funds-transfer network. A managed services gateway (MSG) 202 is operatively connected to a managed services platform (MSP) 204, at least one consumer device 206, and at least one bank server 208. The bank server includes a managed services account 210 and at least one consumer account 212 associated with the consumer device 206. The MSP 204 is operatively connected to a trust platform 214, which is also operatively connected to the bank server 208 and a national managed services account 218. In some embodiment, the MSG 202 is also connected to a managed service client 216. The MSP 204 may also be operatively connected with an employer payroll system 220, for example via an API, for collecting unique consumer information in support of calculating credit scores. To enable real-time messaging, the connections between the MSG 202, MSP 240, and trust platform 214 utilize securely interconnects via API or REST objects.

Managed services include, for example, providing electronic and financial systems to extend credit and transfer funds outside of the traditional banking system. Consumers include any person or entity outside of the traditional banking system or managed services provided. For example, and not in limitation, individual employees of a company may be consumers. As another example, a small business may also be a consumer.

The consumer device 206 may be any computing device as described above which is loaded with appropriate software to communicate with the MSG (for example through custom API messages) display content to the consumer, and obtain input from the consumer. Examples of consumer devices include, but are not limited to, desktop computers, laptop computers, smartphones, tablets, and smart watches. A person skilled in the art will understand that additional computing devices available at the time of this disclosure or in the future may have the necessary capabilities. The MSG 202, MSP 204, trust platform 214, and MSC 216 may be individual computer servers, applications loaded on a single server, or may be any combination of the two, including backup and redundant equipment for any of applications.

Figure 3:
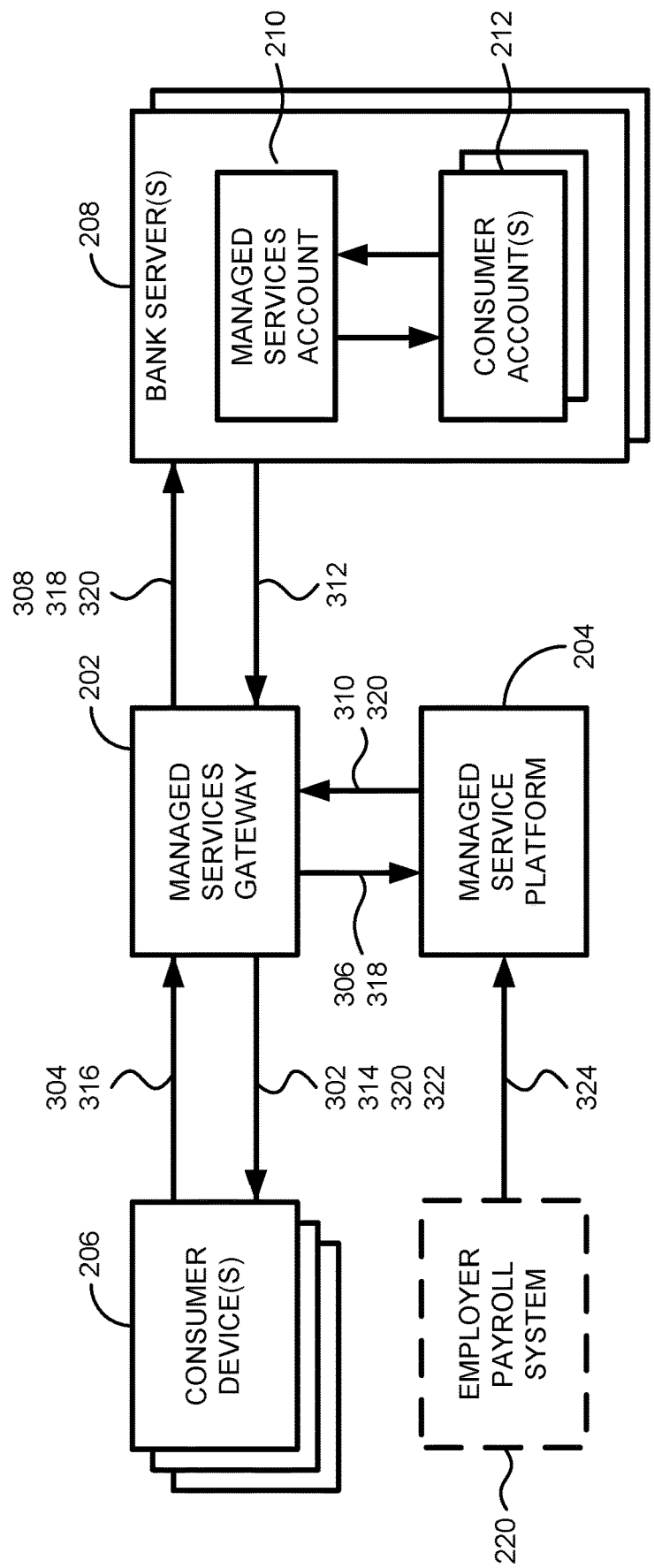
FIG. 3 is a block diagram of a system for account registration, requesting and approving credit lines, and transferring funds via real time deposits into a bank account or the instant issuance or reload of a virtual bank card which illustrates the functional relations between its components when registering a new consumer account, in accordance with the present disclosure.

FIG. 3 depicts the active components of the system and their interactions when registering a new consumer account. The consumer device 206 downloads and installs data 302 for communicating with the MSG 202, such as a mobile app or information for a web page. The consumer device then sends a new account registration request 304 to the MSG 202. The MSG 202 then sends a verification request 306 to the MSP 204 and a verification request 308 to the bank server 208. The MSP 204 verifies that the appropriate national managed services account, local managed services account, and consumer credit line account exist and returns an account approval message 310 to the MSG 202. The bank server 208 likewise confirms that the appropriate local managed services account 210 and consumer checking or savings account 212 exist, and returns an account approval message 312 to the MSG 202. The MSG 202 then sends an account approval message 314 to the consumer device 206, which then solicits a confirmation from the consumer. The confirmation is returned to the MSG 202 as confirmation data 316.

Upon receiving the confirmation data 316, the MSP 204 obtains credit information 324 and assigns a maximum authorized funding level for the new account. In one embodiment, this credit information 324 may be obtained from real-time, gateway API connections into one or more employer payroll systems 220 and may include current employment status. Credit information 324 may also include non-traditional information unique to a consumer's relationship with an employer such as employment status, grade level, monthly salary, commissions, length of employment, stock options, 401(k) account savings, vacation and sick days. The credit information 324 is used to generate a custom credit score unique to each consumer. The MSG 202 also establishes consumer credentials to authenticate future transactions, such as a user name and password or personal identification number (PIN). The MSG 202 also sends a confirmation message 318 to the MSP 204 and the bank server 208.

Upon receiving the confirmation message 318, the MSP 204 generates a new managed-services consumer account number 320 which is returned to the consumer device 206 and the bank server 208 via the MSG 202. The bank server 208 links the consumer account 212 to the managed services account 210 and to the new managed services consumer account number 320 and sends a notification to the MSG 202 and MSP 204. The MSP 202 then sends an account-creation notification 322 to the consumer device 206, for example via text and email messaging.

Figure 4:
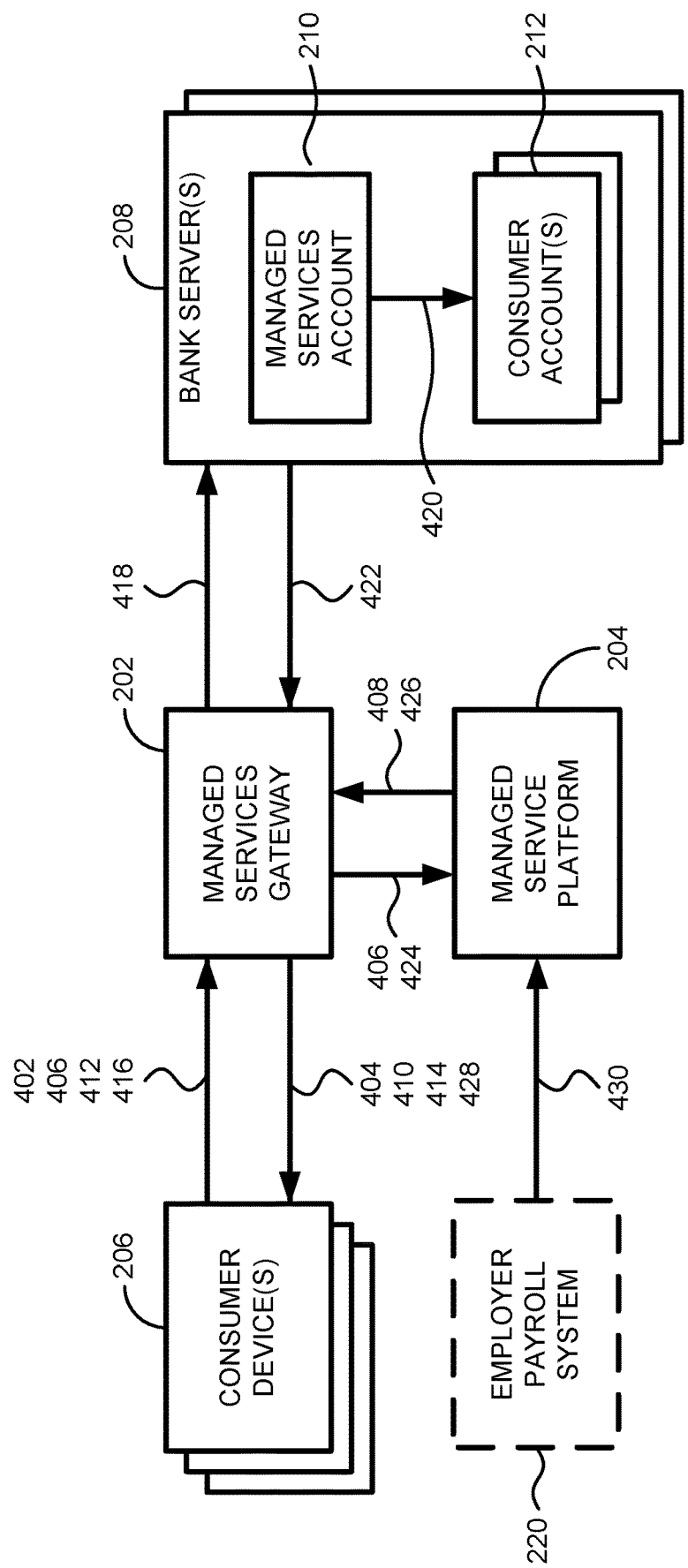
FIG. 4 is a block diagram of a system for account registration, requesting and approving credit lines, and transferring funds via real time deposits into a bank account or the instant issuance or reload of a virtual bank card which illustrates the functional relations between its components when issuing a new consumer credit line via a consumer device, in accordance with the present disclosure.

FIG. 4 depicts the active components of the system and their interactions when initiating a new funding request, or card-reload transaction, to transfer funds from the consumer's credit line via a consumer device. The consumer device 206 transmits a login request 402 to the MSG 202, which returns a login verification 404 if login is successful. The MSG 202 sends an account verification request 406 to the MSP 204, which then transmits an account verification message 408 to the MSG 202, which includes a previously-determined authorized funding level and verifies that the consumer account exists and is in good standing.

The authorized funding level is determined based on the maximum authorized funding level less any outstanding funds that have been transferred or loaned to the consumer. The maximum authorized funding level is determined, at minimum, when a new managed-services consumer account is registered (see FIG. 3, supra). In some embodiments, the maximum authorized funding level may be determined at regular intervals. In some embodiments, the maximum authorized funding level may be determined continuously, in real time, based on a continuous stream of consumer account data. In other embodiments, the maximum authorized funding level may be determined in real time whenever new consumer account information is obtained by the MSP 204.

In some embodiments, the maximum authorized funding level may be determined based on an assessment of the consumer's creditworthiness. Credit information 430 may include non-traditional information unique to a consumer's relationship with an employer such as employment status, employment grade level, monthly salary, commissions, length of employment, stock options, 401(k) account savings, vacation and sick days with all contributing to a custom, credit score unique to each consumer. In some embodiments, credit information 430 may be obtained at regular intervals. In other embodiments, credit information 430 may be obtained continuously, in real time, from one or more sources. For example, a credit information source such as an employer payroll system 220 may transmit new credit information 430 to the MSP 204 as it becomes available. Similarly, credit may be evaluated continuously and in real time based on the stream of incoming credit information.

Upon receiving the account verification message 408 from the MSP 204, the MSG 202 transmits the authorized funding amount 410 for the consumer to the consumer device 206. The consumer device 206 then presents the consumer device with options to transfer amounts up to the presently authorized funding amount 410. The consumer device 206 sends a requested transfer amount to the MSG 202 412 and the MSG 202 returns a transfer approval message 414 to the consumer device 206. The consumer device 206 solicits a confirmation from the consumer. For example, the confirmation solicitation may be a button on a GUI. Once the consumer provides a confirmation, the consumer device 206 transmits a confirmation message 416 to the MSG 202. The MSG 202 then transmits an internal funds transfer instruction 418 to the bank server 208 associated with the consumer's account 212. The internal funds transfer instruction 418 causes the bank server 208 to transfer funds 420 equal to the requested amount from the local managed services account 210 to the consumer's account 212.

Because this is an internal transfer between accounts held by the same bank, the transaction does not need to be processed through a clearinghouse. Therefore, the transfer can take place in real time, as quickly as the bank server 208 can process it. In other words, the funds transfer can be essentially instantaneous. The consumer is also provided an option to issue a virtual card for the amount requested as a transfer from the credit line account. Upon issue, the virtual card is immediately activated and available for use and redemption.

After the funds are transferred internally between accounts with the bank, the bank server 208 then sends a funds transfer confirmation 422 to the MSG 202. The MSG sends a funds transfer confirmation 424 to the MSP 204 which then posts the transferred amount to the consumer's account with the managed-services provider and transmits a posting notification 426 to the MSG 202. The MSG 202 then transmits a posting notification 428 to the consumer device 206, for example via text and email. As explained above, the messaging process is only limited by the speed of the servers, the consumer device, and the networks involved, and therefore can take place in real time.

Figure 5:
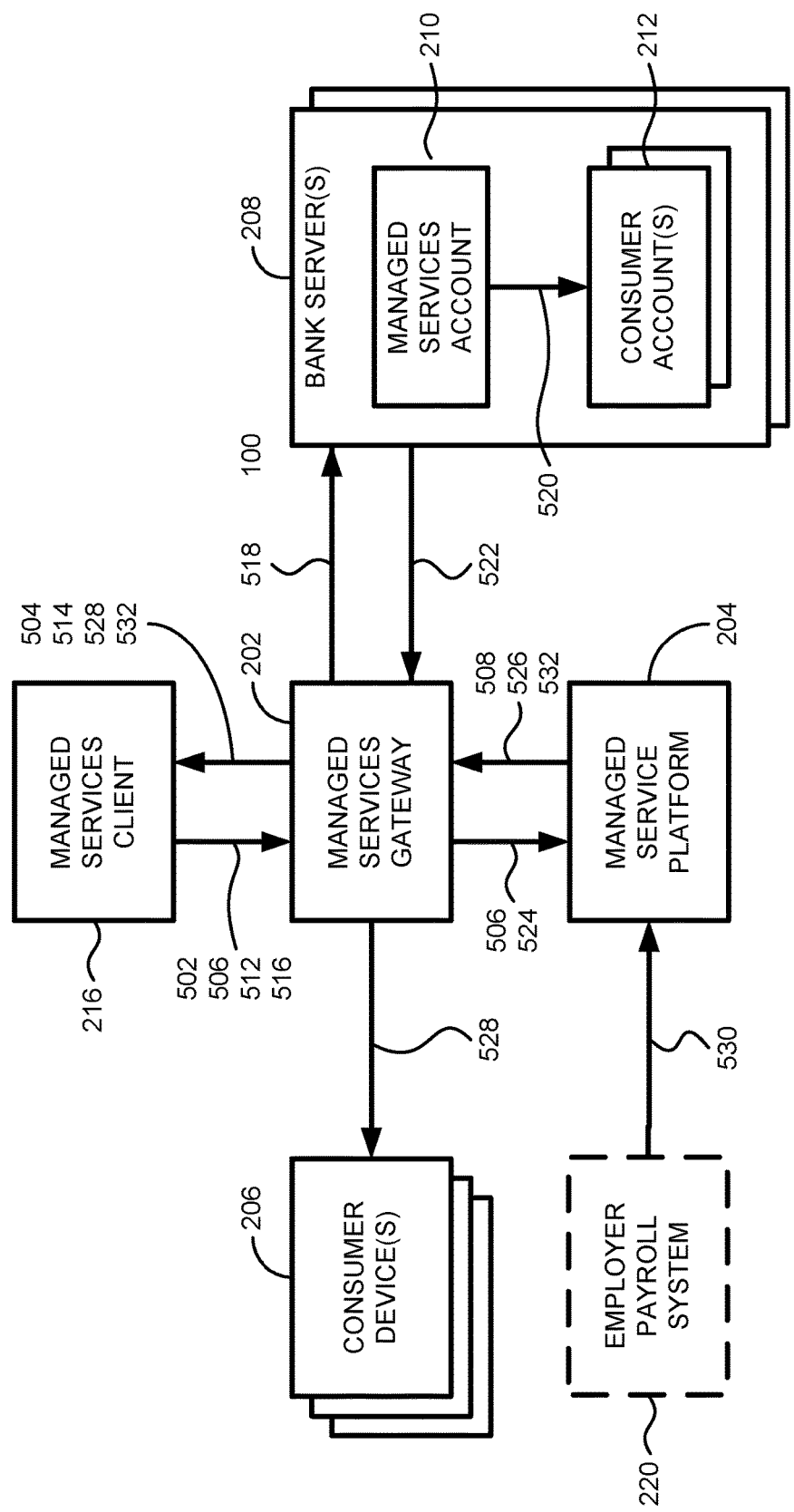
FIG. 5 is a block diagram of a system for account registration, requesting and approving credit lines, and transferring funds via real time deposits into a bank account or the instant issuance or reload of a virtual bank card which illustrates the functional relations between its components when manually issuing a consumer credit line via a managed services client, in accordance with the present disclosure

FIG. 5 depicts the active components of the system and their interactions when initiating a new funding request, or reload transaction, to transfer funds from the consumer's credit line via a managed services client, for example if the consumer calls a customer service representative to initiate the transfer. The MCG 216 transmits a login request 502 to the MSG 202, which returns a login verification 504 if login is successful. The MSG 202 sends an account verification request 506 to the MSP 204, which then transmits an account verification message 508 to the MSG 202, which includes a previously-determined authorized funding level and verifies that the consumer account exists and is in good standing.

The authorized funding level is determined based on the maximum authorized funding level less any outstanding funds that have been transferred or loaned to the consumer. The maximum authorized funding level is determined, at minimum, when a new managed-services consumer account is registered (see FIG. 3, supra). In some embodiments, the maximum authorized funding level may be determined at regular intervals. In some embodiments, the maximum authorized funding level may be determined continuously, in real time, based on a continuous stream of consumer account data. In other embodiments, the maximum authorized funding level may be determined in real time whenever new consumer account information is obtained by the MSP 204.

In some embodiments, the maximum authorized funding level may be determined based on an assessment of the consumer's creditworthiness. Credit information 530 may include non-traditional information unique to a consumer's relationship with an employer such as employment status, employment grade level, monthly salary, commissions, length of employment, stock options, 401(k) account savings, vacation and sick days with all contributing to a custom, credit score unique to each consumer. In some embodiments, credit information 530 may be obtained at regular intervals. In other embodiments, credit information 530 may be obtained continuously, in real time, from one or more sources. For example, a credit information source such as an employer payroll system 220 may transmit new credit information 530 to the MSP 204 as it becomes available. Similarly, credit may be evaluated continuously and in real time based on the stream of incoming credit information.

Upon receiving the account verification message 508 from the MSP 204, the MSG 202 transmits the authorized funding amount 510 for the consumer to the MCG 216. The MCG 216 then presents the consumer device with options to transfer amounts up to the presently authorized funding amount 510. The MCG 216 sends a requested transfer amount to the MSG 202 512 and the MSG 202 returns a transfer approval message 514 to the MCG 216. The MCG 216 solicits a confirmation from the consumer. For example, the confirmation solicitation may be a button on a GUI. Once the consumer provides a confirmation, the MCG 216 transmits a confirmation message 516 to the MSG 202. The MSG 202 then transmits an internal funds transfer instruction 518 to the bank server 208 associated with the consumer's account 212. The internal funds transfer instruction 518 causes the bank server 208 to transfer funds 520 equal to the loan amount from the local managed services account 210 to the consumer's account 212.

After the funds are transferred internally between accounts with the bank, the bank server 208 then sends a funds transfer confirmation 522 to the MSG 202. The MSG sends a funds transfer confirmation 524 to the MSP 204 which posts the amount to the consumer's account with the managed-services provider and transmits a posting notification 526 to the MSG 202. The MSG 202 then transmits a posting notification 528 to the consumer device 206, for example via text and email.

Figure 6:
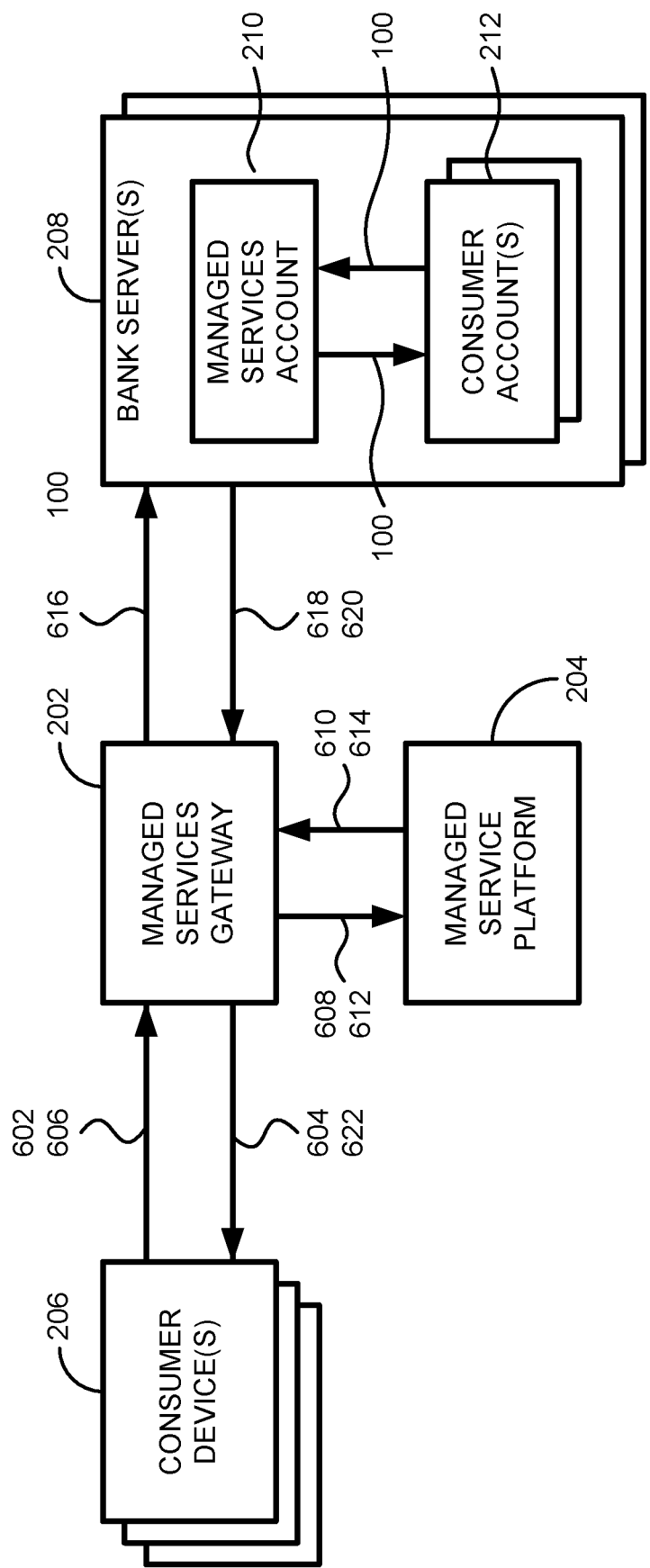
FIG. 6 is a block diagram of a system for account registration, requesting and approving credit lines, and transferring funds via real time deposits into a bank account or the instant issuance or reload of a virtual bank card which illustrates the functional relations between its components when checking an account status, available balance, and history via a consumer device, in accordance with the present disclosure.

FIG. 6 depicts the active components of the system and their interactions when checking an account status, available balance, and history via a consumer device. The consumer device 206 transmits a login request 602 to the MSG 202, which returns a login verification 604 if login is successful. The consumer device 206 then transmits an account status, available balance, and history request 606 to the MSG 202. The MSG 202 sends an account verification request 608 to the MSP 204, which then transmits an account verification message 610 which verifies the consumer account exists and is in good standing. The MSG 202 sends an account balance and transaction history request 612 to the MSP 204, which queries the consumer records for account balance and transaction history and then transmits account transaction details message 614 to the MSG 202. The MSG 202 also sends an account balance request 616 to the bank server, which determines the consumer checking or savings account balance 618 and managed services account balance 620 and transmits these to the MSG 202. The MSG then generates and transmits an account available balance and history message 622 to the consumer device 206.

Figure 7:
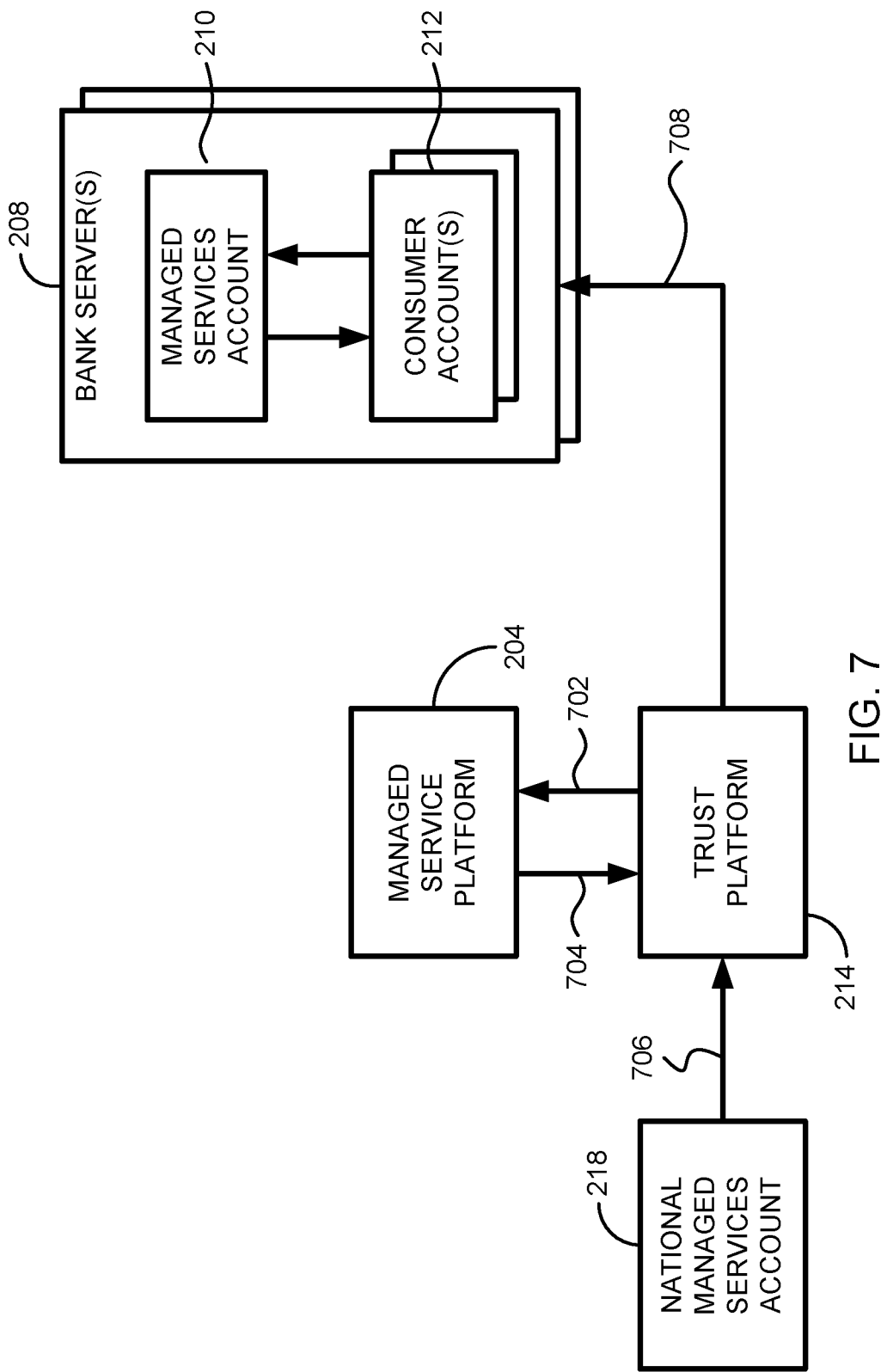
FIG. 7 is a block diagram of a system for account registration, requesting and approving credit lines, and transferring funds via real time deposits into a bank account or the instant issuance or reload of a virtual bank card which illustrates the functional relations between its components when funds are transferred from a national managed services account to local managed services accounts, in accordance with the present disclosure.

FIG. 7 depicts the active components of the system and their interactions when funds are transferred from a national managed services account to local managed services accounts. Funds may be transferred from the national managed services account to local managed services accounts on a regular basis or as needed, in real time. The trust platform 214 transmits a disbursement inquiry 702 to the MSP 204. The MSP 204 returns a disbursement message 704 which includes the details of all account transaction (disbursements and payments) made or received from individual consumer accounts 212 during a inquiry period (e.g. weekly). The disbursement message 704 also itemizes the transactions by banking institution and by managed services account 210.

Based on the disbursement message 704, the trust platform 214 withdraws sufficient funds 706 from the national managed services account 218 and then transfers smaller amounts 708 to each local managed services account 210. The amount transferred 708 to each local managed services account 210 is based on the expected cash flow for new funds transfers to and payments from to all of the individual consumer accounts 212 associated with the local managed services account 210. This amount 708 may be determined using a predictive algorithm, a safety factor (e.g. a financial "cushion"), and/or data available from other sources, such as payroll data.

Figure 8:
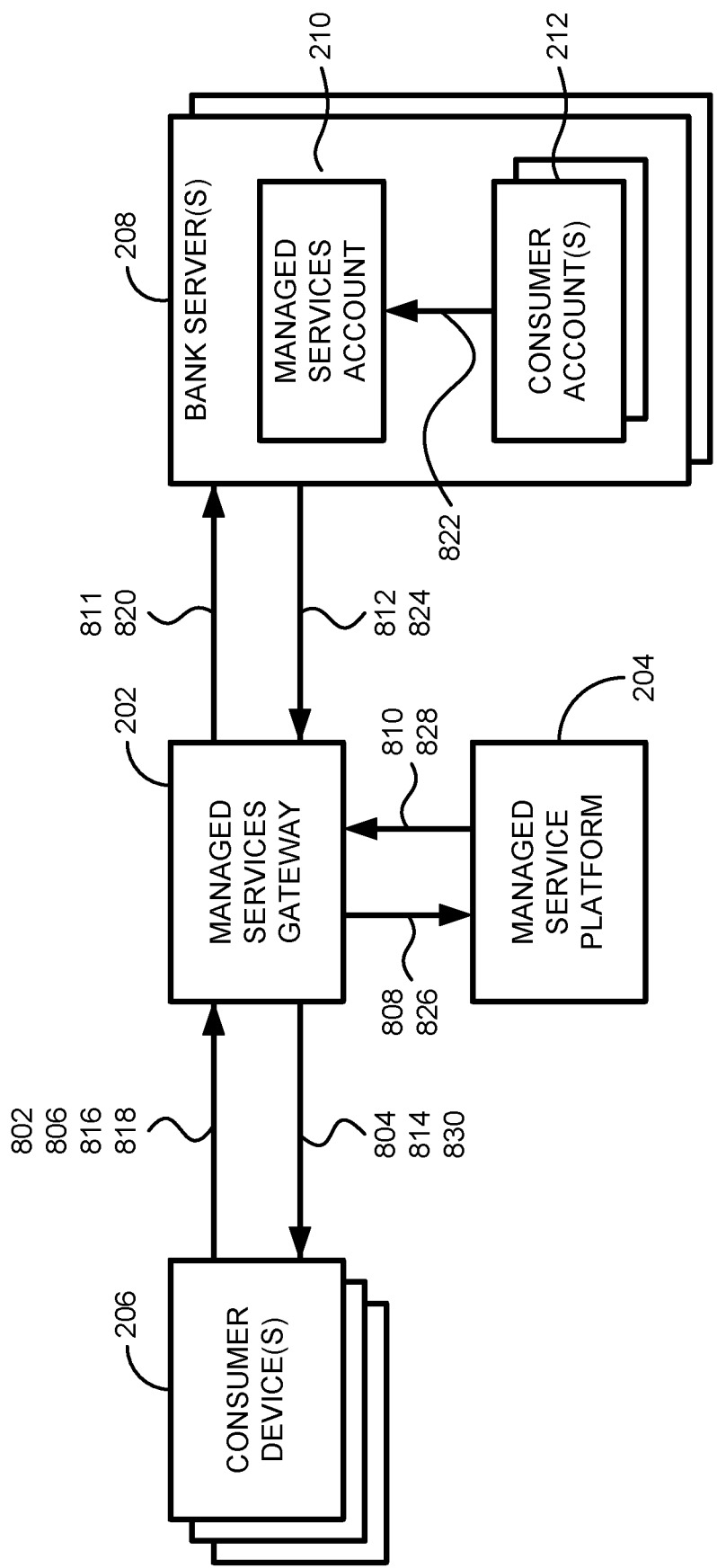
FIG. 8 is a block diagram of a system for account registration, requesting and approving credit lines, and transferring funds via real time deposits into a bank account or the instant issuance or reload of a virtual bank card which illustrates the functional relations between its components when paying a consumer credit line via a consumer device, in accordance with the present disclosure.

FIG. 8 depicts the active components of the system and their interactions when paying a consumer credit line via a consumer device. The consumer device 206 transmits a login request 802 to the MSG 202, which returns a login verification 804 if login is successful. The consumer device 206 then transmits a payment request 806 to the MSG 202. The MSG 202 sends an account verification request 808 to the MSP 204, which then transmits an account verification message 810 which verifies the consumer account exists and is in good standing.

In some embodiments, the MSG 202 transmits a consumer account balance request 811 to the bank server 208. The bank server 208 then returns a consumer account balance 812. In these embodiments, the MSG 202 then compares the requested credit line payment amount to the consumer account balance 812. If the requested payment exceeds consumer account balance 812, the MSG 202 transmits a payment denial message 814 to the consumer device 206.

If the requested payment is less than the consumer account balance 812, or if the embodiment does not incorporate this step, the MSG 202 transmits a credit line payment approval message 816 to the consumer device 206. The consumer device 206 then solicits a payment confirmation from the consumer. For example, the confirmation solicitation may be a button on a GUI. The payment confirmation request may include the amount of the requested payment 806 and/or the consumer account balance 812 for the consumer's convenience. Once the consumer provides a confirmation, the consumer device 206 transmits a payment confirmation message 818 to the MSG 202. The MSG 202 then transmits an internal funds transfer instruction 820 to the bank server 208 associated with the consumer's account 212. The internal funds transfer instruction 820 causes the bank server 208 to transfer funds 822 equal to the requested payment amount 806 from the consumer's account 212 to the local managed services account 210.

After the funds are transferred internally between accounts with the bank, the bank server 208 sends a funds transfer confirmation 824 to the MSG 202. The MSG sends a funds transfer confirmation 826 to the MSP 204 which posts the credit line payment amount to the consumer's account with the managed-services provider and transmits a posting notification 828 to the MSG 202. The MSG 202 then transmits a posting notification 830 to the consumer device 206, for example via text and email. As explained above, the messaging process is only limited by the speed of the servers, the consumer device, and the networks involved, and therefore can take place in real time.

Figure 9:
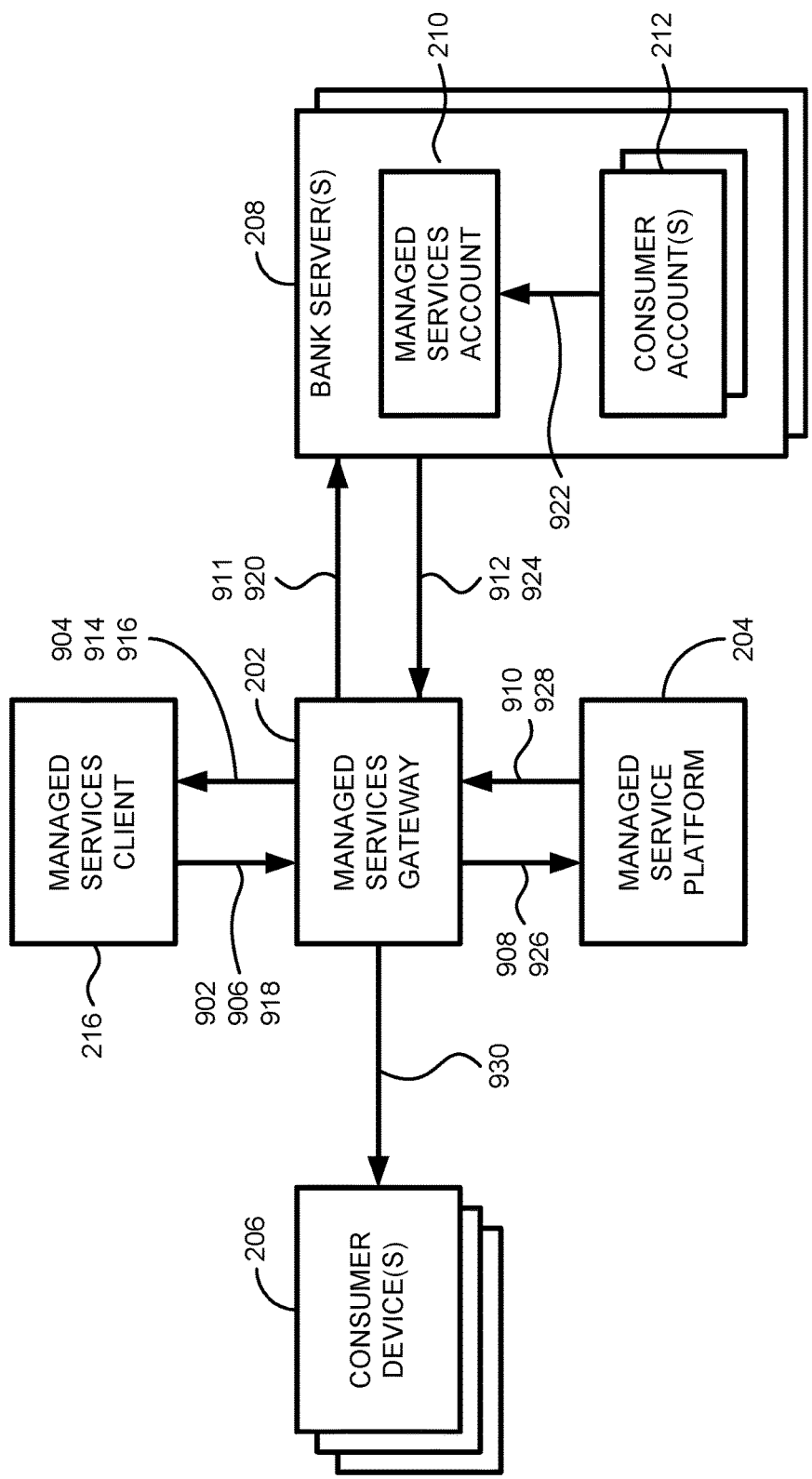
FIG. 9 is a block diagram of a system for account registration, requesting and approving credit lines, and transferring funds via real time deposits into a bank account or the instant issuance or reload of a virtual bank card which illustrates the functional relations between its components when paying a credit line via a managed services client, in accordance with the present disclosure.

FIG. 9 depicts the active components of the system and their interactions when completing a payment via a managed services client. The managed services client 216 transmits a login request 902 to the MSG 202, which returns a login verification 904 if login is successful. The managed services client 216 then transmits a payment request 906 to the MSG 202. The MSG 202 sends an account verification request 908 to the MSP 204, which then transmits an account verification message 910 which verifies the consumer account exists and is in good standing.

In some embodiments, the MSG 202 transmits a consumer account balance request 911 from the bank server 208. The bank server 208 then returns a consumer account balance 912. In these embodiments, the MSG 202 then compares the requested payment amount to the consumer account balance 912. If the requested payment exceeds consumer account balance 912, the MSG 202 transmits a payment denial message 914 to the managed services client 216.

If the requested payment is less than the consumer account balance 912, or if the embodiment does not incorporate this step, the MSG 202 transmits a payment approval message 916 to the managed services client 216. The managed services client 216 solicits a payment confirmation from the consumer. For example, the confirmation solicitation may be a button on a GUI. The payment confirmation request may include the amount of the payment 906 and/or the consumer account balance 912 for the consumer's convenience. Once the consumer provides a confirmation, the managed services client 216 transmits a payment confirmation message 918 to the MSG 202. The MSG 202 then transmits an internal funds transfer instruction 920 to the bank server 208 associated with the consumer's account 212. The internal funds transfer instruction 920 causes the bank server 208 to transfer funds 922 equal to the payment amount 906 from consumer's account 212 to the local managed services account 210.

After the funds are transferred internally between accounts with the bank, the bank server 208 then sends a funds transfer confirmation 924 to the MSG 202. The MSG sends a funds transfer confirmation 926 to the MSP 204 which posts the payment amount to the consumer's account with the managed-services provider and transmits a posting notification 928 to the MSG 202. The MSG 202 then transmits a loan posting notification 930 to the consumer device 206, for example via text and email.

Figure 10:
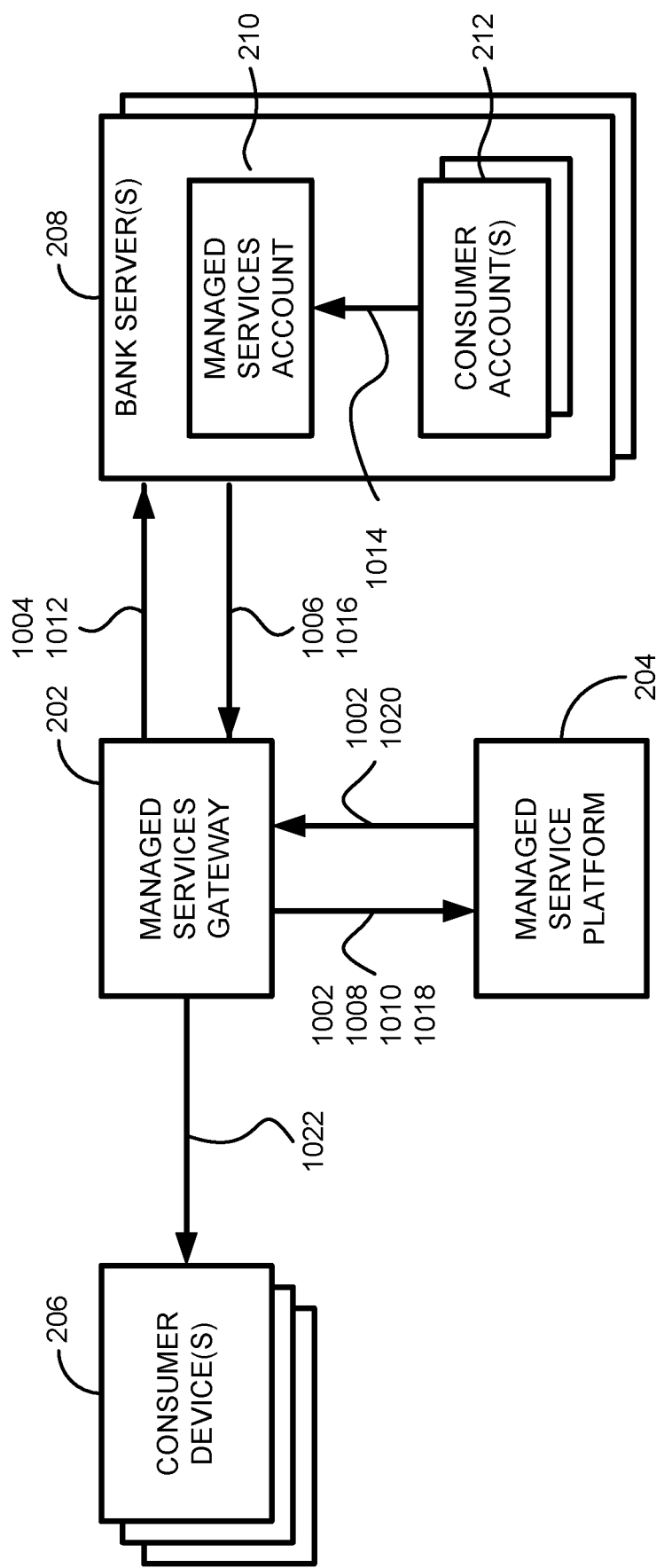
FIG. 10 is a block diagram of a system for requesting, approving, and transferring loan funds in real time illustrating the functional relations between its components when paying a loan from consumer accounts using batch processing, in accordance with the present disclosure.

FIG. 10 depicts the active components of the system and their interactions when paying loans from consumer accounts using batch processing. The MSP 204 transmits a batch processing command 1002 to the MSG 202. The batch processing command 1002 includes details of all the transactions to be executed in the batch. Each transaction details the consumer account 212, managed services account 210, and payment amount to be made.

In some embodiments, the MSG 202 may transmit consumer account balance requests 1004 to the bank server 208 based in the batch processing command 1002. The bank server 208 then returns consumer account balances 1006. In these embodiments, the MSG 202 then compares the requested loan payment amounts in the batch processing command 1002 to the consumer account balances 1006. For each transaction, if the requested loan payment amount exceeds the consumer account balance 1006, the MSG 202 transmits a loan payment denial message 1008 to the MSP 204.

If each requested loan payment is less than the consumer account balance 1006, or if the embodiment does not incorporate this step, the MSG 202 transmits a loan payment approval message 1010 to the MSP 204. The MSG 202 then transmits an internal funds transfer instruction 1012 to the bank server 208 associated with the consumer's account 212. The internal funds transfer instruction 1012 causes the bank server 208 to transfer funds 1014 equal to the loan payment amount from consumer's account 212 to the local managed services account 210.

After the funds are transferred internally between accounts with the bank, the bank server 208 then sends a funds transfer confirmation 1016 to the MSG 202. The MSG sends a funds transfer confirmation 1018 to the MSP 204 which posts the loan payment amount to the consumer's account with the managed-services provider and transmits a loan posting notification 1020 to the MSG 202. The MSG 202 then transmits a loan posting notification 1022 to each consumer device 206. As explained above, the messaging process is only limited by the speed of the servers, the consumer device, and the networks involved, and therefore can take place in real time.

Figure 11:
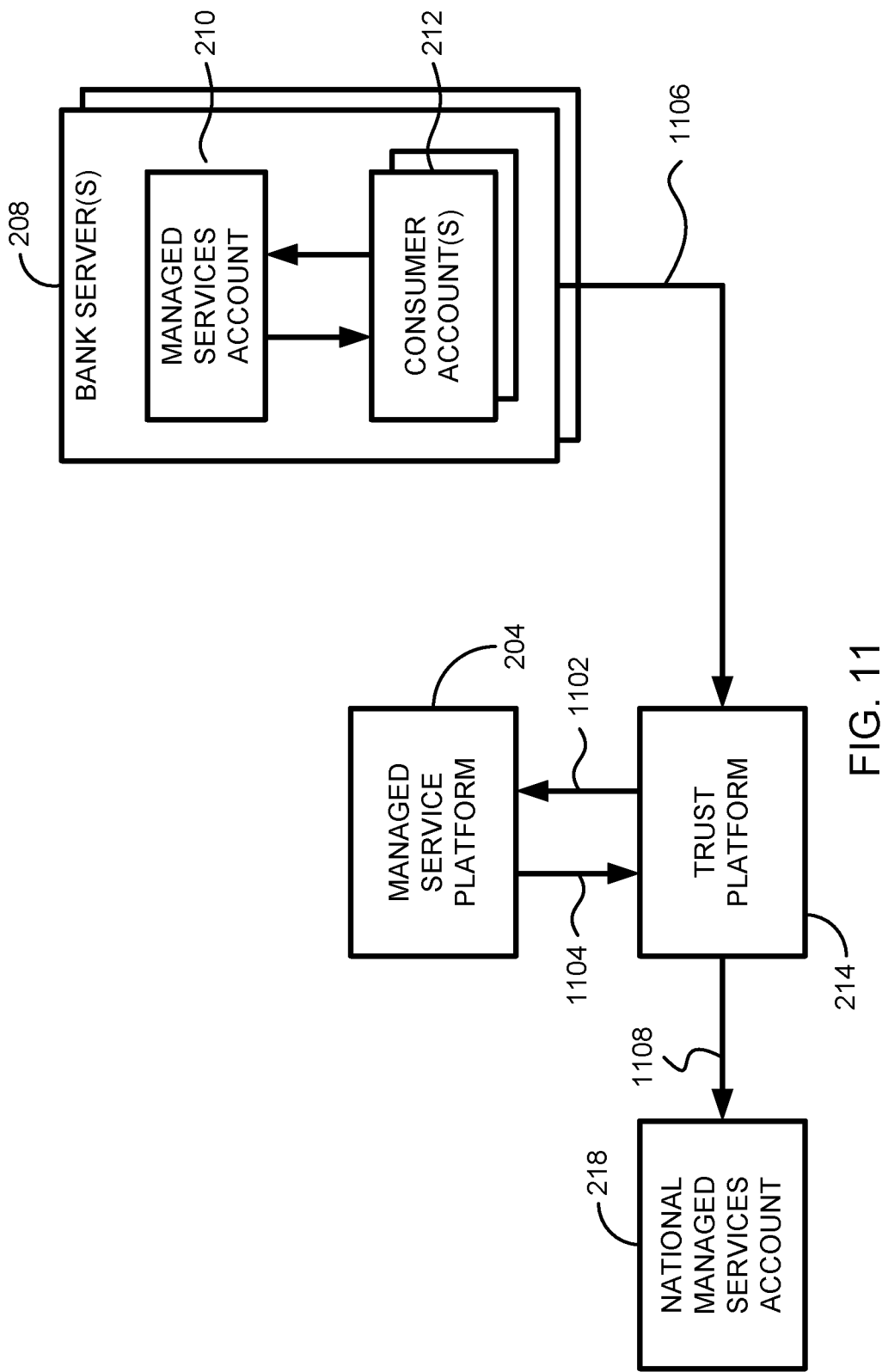
FIG. 11 is a block diagram of a system for requesting, approving, and transferring loan funds in real time illustrating the functional relations between its components when components when funds are transferred from a local managed services accounts to the national managed services account, in accordance with the present disclosure.

FIG. 11 depicts the active components of the system and their interactions when components when funds are transferred from a local managed services accounts to the national managed services account. Funds may be transferred from local managed services accounts 210 to the national managed services account 218 on a regular basis or as needed. The trust platform 214 transmits a disbursement inquiry 1102 to the MSP 204. The MSP 204 returns a disbursement message 1104 which includes the details of all account transaction (disbursements and payments) made or received from individual consumer accounts 212 during a inquiry period (e.g. weekly). The disbursement message 704 also itemizes the transactions by banking institution and by managed services account 210.

Based on the disbursement message 1104, the trust platform 214 withdraws unneeded funds 1106 from the local managed services accounts 210 and then transfers the funds 1108 to the national managed services account 218. Funds may be unneeded in the local managed services account 210 if, for example, the number of potential credit lines for that bank has decreased, or the aggregate amount of funding authorization for accounts with that bank has decreased. The amount transferred 1106 from each local managed services account 210 is based on the expected cash flow for new loans and payments to all of the individual consumer accounts 212 associated with the local managed services account 210. This amount 1106 may be determined using a predictive algorithm, a safety factor (e.g. a financial "cushion"), and/or data available from other sources, such as payroll data.

Figure 12:
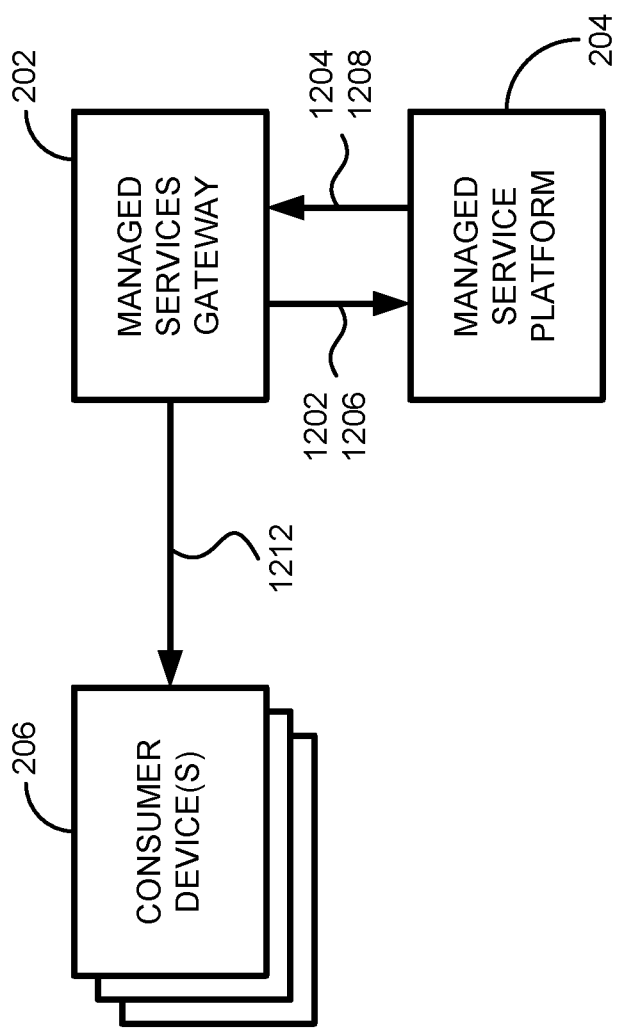
FIG. 12 is a block diagram of a system for requesting, approving, and transferring loan funds in real time illustrating the functional relations between its components when components when notification, fees, and interested are posted to multiple consumer accounts using batch processing, in accordance with the present disclosure.

FIG. 12 depicts the active components of the system and their interactions when components when notifications, fees, and interest are posted to multiple consumer accounts using batch processing. In some embodiments, notifications, fees, and interest may be posted in real time using batch processing to help consumers better manage their funds. The MSG 202 transmits a request to publish notifications, fees, and interest 1202 to the MSP 204. The MSP 204 generates a report 1204 including all of the notifications, fees, and interest charges to be posted in the batch. The MSP 204 then transmits this report 1204 to the MSG 202 and updates the appropriate account records accordingly. In some embodiments, the MSG 202 may resend the report 1206 to the MSP 204 for error checking. In these embodiments, the MSP 204 will transmit a confirmation message 1208 to the MSG 202 if no errors are found, or an error message 1210 if errors are found. After the report 1204 is received by the MSG 202, and a confirmation message 1208 received, if required, the MSG transmits appropriate notifications 1212 to all of the consumer devices 206 whose associated accounts have been updated. When fees or interested are posted to managed-services consumer accounts, they may also be deducted from consumer banking accounts 212 in real time, as explained above for other payments.

Figure 13:
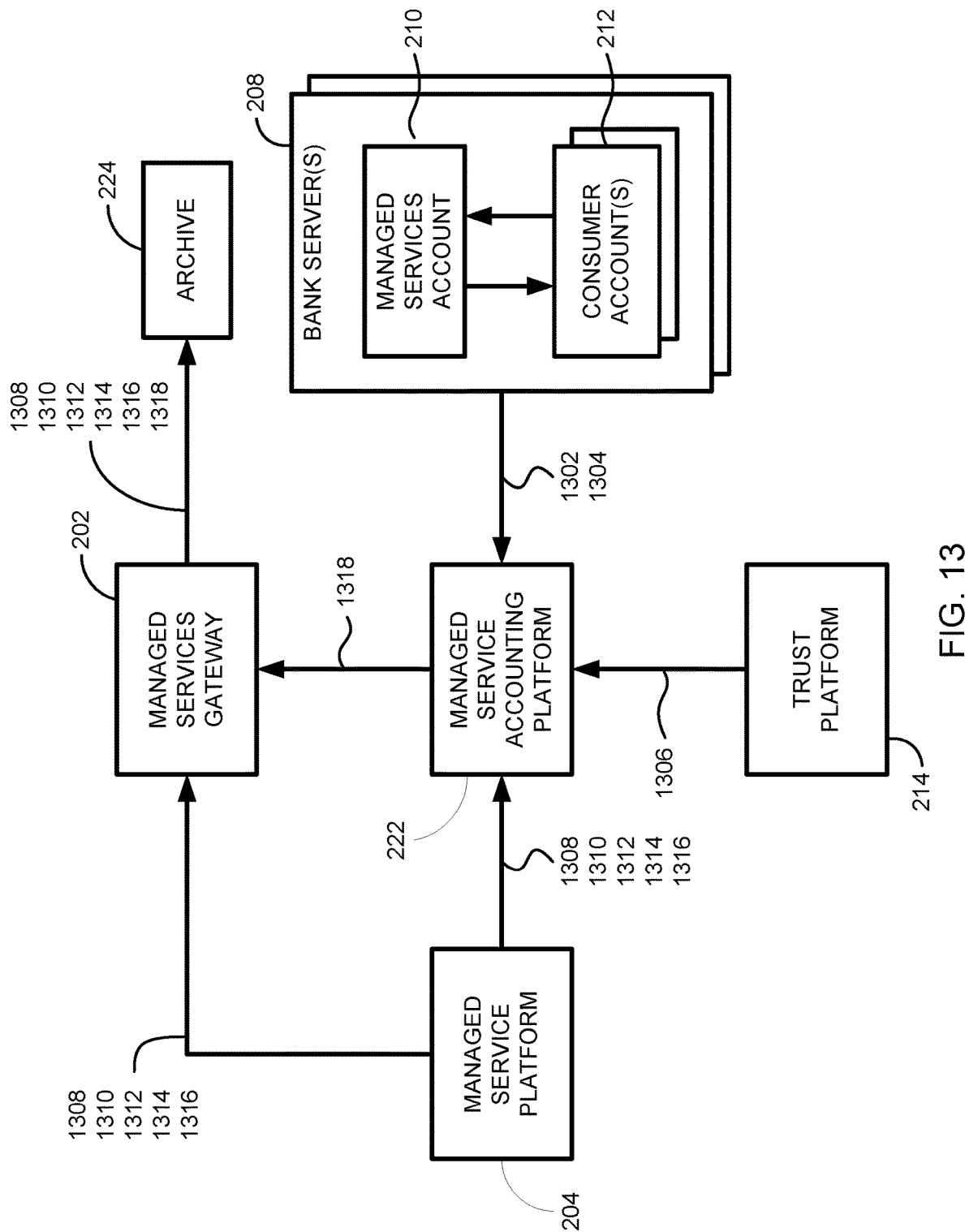
FIG. 13 is a block diagram of a system for requesting, approving, and transferring loan funds in real time illustrating the functional relations between its components when performing reconciliation and settlement operations, in accordance with the present disclosure.

FIG. 13 depicts the active components of the system and their interactions when performing reconciliation and settlement operations. The bank server 208 transmits transaction details 1202 for the managed services accounts and consumer accounts and an error report 1204 to a managed services accounting platform 222. The trust platform 214 likewise transmits transactions details of the national managed services account 1206 to the managed services accounting platform 222. The MSP transmits details of newly registered consumer accounts 1208, transaction details for transfers to and payments from consumer accounts 1210, ACH transaction details for each local managed services account 1212, details of cards issued 1214, and details of all fees and interest posted 1216 to the MSG 202 and to the managed services accounting platform 222. The managed services accounting platform 222 compiles and reconciles all of the transaction details it receives and transmits a settlement report 1218 to the MSG 202. The MSG 202 transmits the settlement report 1218 and all of the transaction data received from the MSP 204 to an archive 224.

Figure 14:
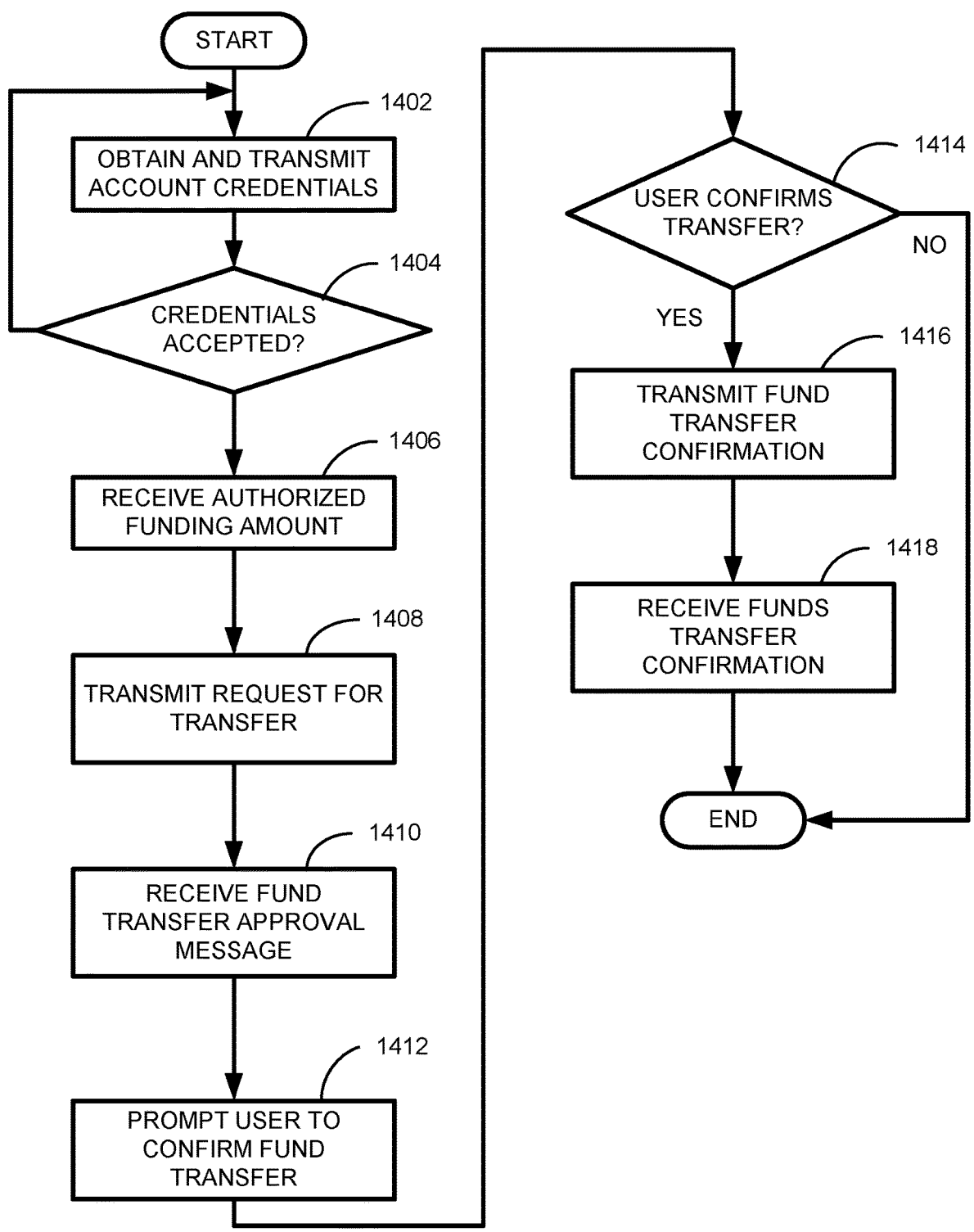
FIG. 14 is a flow chart illustrating a process followed by a consumer device for initiating a new funding request, or reload transaction, to transfer funds from the consumer's credit line via a consumer device.

FIG. 14 depicts a flow chart for initiating a transfer of funds into a consumer account 212 using a consumer device 206, presented from the perspective of the consumer device. At 1402, the device obtains credentials from the consumer and transmits them to a server hosting a managed services gateway (MSG) 202. At 1404, if the account credentials are accepted, the process continues. Otherwise, the process starts over. At 1406 the device receives an authorized funding amount from the MSG. At 1408, the device transmits a request to transfer funds. The amount of the request is limited by the device to less than or equal to the authorized funding amount received in step 1406. At 1410, the device receives a fund-transfer approval message. at 1412, the device prompts the consumer, for example through a button on a GUI, to confirm the funds transfer. At 1414, if the consumer confirms the transfer, the process continues. If the consumer does not confirm the transfer, the process terminates. At 1416, the device transmits the consumer's funds-transfer confirmation. At 1418, the device receives a confirmation from the MSG that the funds have been transferred to the consumer's bank account.

Figure 15:
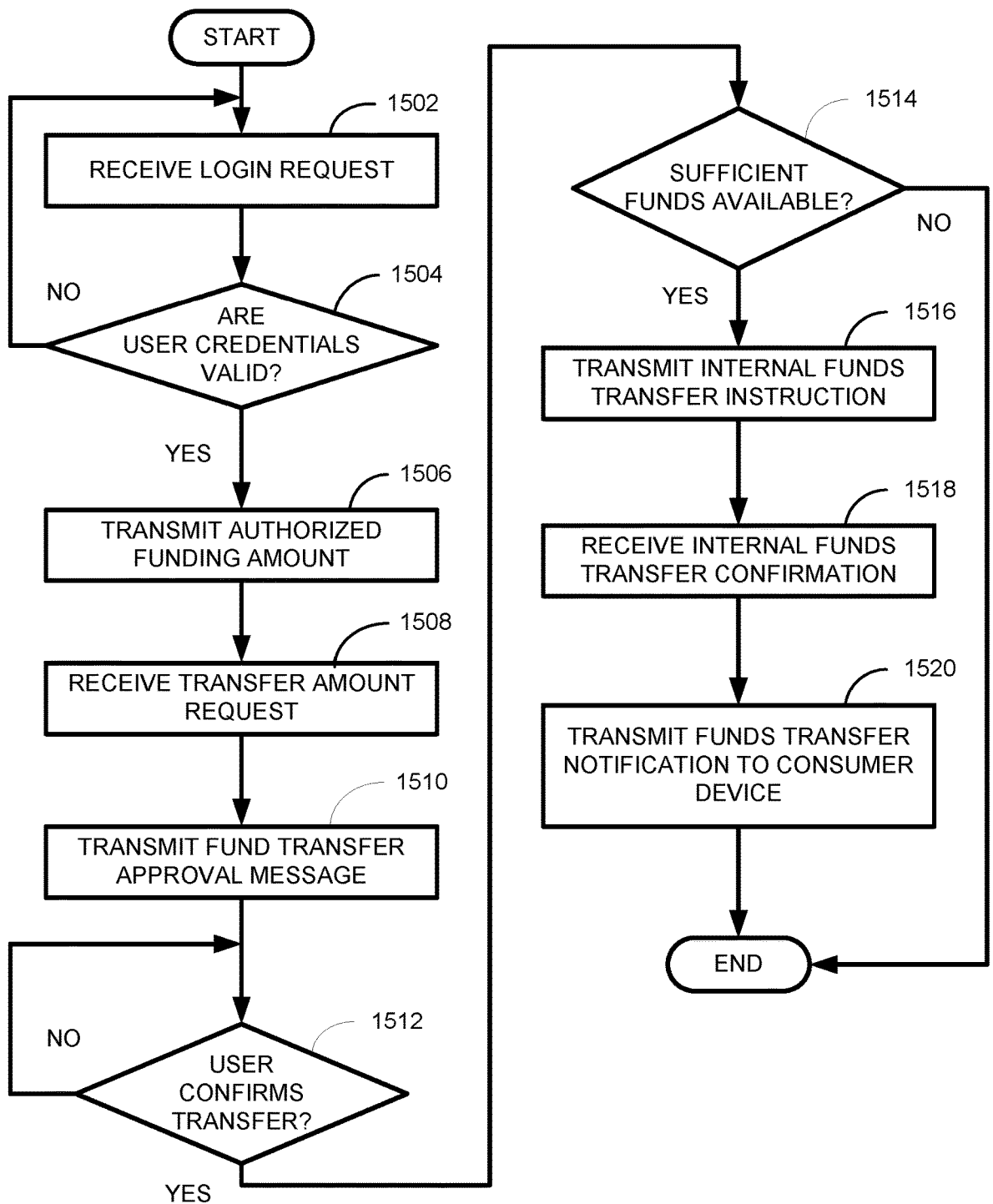
FIG. 15 is a flow chart illustrating a process followed by a server hosting a managed services gateway for initiating a new funding request, or reload transaction, to transfer funds from the consumer's credit line via a consumer device.

FIG. 15 depicts a flow chart for a server initiating a transfer of funds into a consumer account 212 based on instructions received from a consumer device 206, from the perspective of a server hosting managed services gateway (MSG) 202. At 1502, the server receives a login request from a consumer device. At 1504, if the credentials included with the login request are verified, the process continues; otherwise it restarts. At 1506, the server transmits an authorized funding amount to the device. At 1508, the server receives a request from the device to transfer funds to the consumer's account. The amount requested is limited by the device to be less than or equal to the authorized funding amount. At 1510, the server transmits a funds-transfer approval message to the consumer device. At 1512, if the server receives a funds-transfer confirmation from the consumer device, the process continues; otherwise the server waits a predetermined amount of time for a confirmation. At 1514, if sufficient funds are available in a local managed-services account to complete the funds transfer, the process continues. If not, then the process is terminated. At 1516, the server transmits instructions to a bank server to transfer the requested funding amount from the local-managed services account to the consumer's bank account in real time. At 1518, the server receives a confirmation from the bank server that the funds successfully transferred. At 1520, the server transmits a funds-transfer notification to the consumer's device.

To facilitate an understanding of the principals and features of the disclosed technology, example implementations are explained above. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It must also be noted that, as used in the specification and the appended claims, the singular forms "a," "an" and "the" include plural referents unless the context clearly dictates otherwise. Similarly, plural forms include singular referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

The design and functionality described in this application is intended to be an example and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. For example, one skilled in the art will recognize that executable instructions may be stored on a non-transient, computer-readable storage medium, such that when executed by one or more processors, causes the one or more processors to implement the method described above.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, a graphical object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain implementations of this technology are described above with reference to block and flow diagrams of computing devices and methods and/or computer program products according to example implementations of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, some implementations of this disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of this disclosure have been described in connection with what is presently considered to be the most practical and various implementations, it is to be understood that this disclosure is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the technology and also to enable any person skilled in the art to practice certain implementations of this technology, including making and using any apparatuses or systems and performing any incorporated methods. The patentable scope of certain implementations of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A managed services platform (MSP) comprising:
   a processor;
   non-transient memory, operatively connected to the processor, the non-transient memory comprising instructions which, when executed by the processor, cause the processor to perform a method comprising:
      determining an authorized funding authorization amount for a user account by connecting between the MSP and an employer payroll system of an employer of a user of the user account, and extracting, from the employer payroll system, user account data to determine the funding authorization amount based on the user account data, the user account data comprising at least one of an employment status, an employment grade level, employee benefit accounts, a monthly salary, commissions, a length of employment, available stock options, available 401(k) account savings, available vacation time, available sick days, and available paid time off;
      transmitting, to a user device, the authorized funding amount associated with the user account;
      receiving a funds transfer request from the user device, where the funds transfer request comprises a funding amount less than or equal to the authorized funding amount, and an indication of an electronic bank card owned by a user and maintained with a first bank which operates a bank server;
      instantly issuing and activating the electronic bank card for the user in response to receiving the funds transfer request;
      identifying, based on the funds transfer request, a first local managed services trust account among a plurality of local managed services trust accounts, each of the plurality of local managed services trust accounts being maintained with a bank from among a plurality of banks, and the first local managed services trust account being maintained with the first bank among the plurality of banks;
      transmitting, in real time, an internal funds transfer instruction to the bank server thereby causing the bank server to transfer, via an intra-bank transfer at the first bank and without processing the transfer through a clearinghouse by issuing and activating the electronic bank card owned by the user, and loading, in real time, the electronic bank card owned by the user by transferring the funding amount from the first local managed services trust account to the electronic bank card owned by the user;
      receiving, in real time, an indication of confirmation of an internal funds transfer from the bank server;
      instantly delivering the electronic bank card to the user device in response to receiving the indication of confirmation of the internal funds transfer from the bank server; and
      transmitting an internal funds transfer confirmation message to the user device,
      where the electronic bank card is accepted for immediate payment and settlement by participating merchants via their physical and internet-based point of sale devices.

2. The MSP of claim 1 where the funding authorization amount for the user account is based on a user creditworthiness associated with the user.

3. The MSP of claim 1, wherein the method further comprises initiating, based on the funding amount, a funds transfer from a national managed services account maintained by to the first local managed services account.

4. The MSP of claim 1, wherein the bank server transfers the funding amount from the first local managed services trust account to the electronic bank card owned by the user as quickly as the bank server can process the internal funds transfer instruction.

5. The MSP of claim 1, wherein the method further comprises initiating a funds transfer from a national managed services account maintained by to the first local managed services account based on an expected cash flow for new funds transfers from the first local managed services account.

6. A method for implementing a managed services platform (MSP), the method comprising:
   determining an authorized funding authorization amount for a user account by connecting between the MSP and an employer payroll system of an employer of a user of the user account, and extracting, from the employer payroll system, user account data to determine the funding authorization amount based on the user account data, the user account data comprising at least one of an employment status, an employment grade level, employee benefit accounts, a monthly salary, commissions, a length of employment, available stock options, available 401(k) account savings, available vacation time, available sick days, and available paid time off;
   transmitting, to a user device, the authorized funding amount associated with the user account;
   receiving a funds transfer request from the user device, where the funds transfer request comprises a funding amount less than or equal to the authorized funding amount, and an indication of an account owned by a user and maintained with a first bank which operates a bank server;
   identifying, based on the funds transfer request, a first local managed services trust account among a plurality of local managed services trust accounts, each of the plurality of local managed services trust accounts being maintained with a bank from among a plurality of banks, and the first local managed services trust account being maintained with the first bank among the plurality of banks;

transmitting, in real time, an internal funds transfer instruction to the bank server thereby causing the bank server to transfer, via an intra-bank transfer at the first bank and without processing the transfer through a clearinghouse by issuing and activating an electronic bank card owned by the user, and loading, in real time, the electronic bank card owned by the user by transferring the funding amount from the first local managed services trust account to the account owned by the user;

receiving, in substantial real time, an indication of confirmation of an internal funds transfer from the bank server; and transmitting an internal funds transfer confirmation message to the user device, where the electronic bank card is accepted for immediate payment and settlement by participating merchants via their physical and internet-based point of sale devices.

7. The method of claim 6 where the funding authorization amount for the user account is based on a user creditworthiness associated with the user.

8. The method of claim 6 wherein the method further comprises:
instantly delivering the electronic bank card to the user device in response to receiving the indication of confirmation of the internal funds transfer from the bank server.

9. The method of claim 6, wherein the bank server transfers the funding amount from the first local managed services trust account to the account owned by the user as quickly as the bank server can process the internal funds transfer instruction.

10. The method of claim 6 further comprising initiating a funds transfer from a national managed services account maintained by to the first local managed services account based on an expected cash flow for new funds transfers from the first local managed services account.

11. A non-transitory computer readable medium having stored thereon computer instructions for executing a method implementing a managed services platform (MSP), the method comprising:
determining an authorized funding authorization amount for a user account by connecting between the MSP and an employer payroll system of an employer of a user of the user account, and extracting, from the employer payroll system, user account data to determine the funding authorization amount based on the user account data, the user account data comprising at least one of an employment status, an employment grade level, employee benefit accounts, a monthly salary, commissions, a length of employment, available stock options, available 401(k) account savings, available vacation time, available sick days, and available paid time off;

transmitting, to a user device, the authorized funding amount associated with a user account;

receiving a funds transfer request from the user device, where the funds transfer request comprises a funding amount less than or equal to the authorized funding amount, and an indication of an account owned by the user and maintained with a first bank which operates a bank server;

identifying, based on the funds transfer request, a first local managed services trust account among a plurality of local managed services trust accounts, each of the plurality of local managed services trust accounts being maintained with a bank from among a plurality of banks, and the first local managed services trust account being maintained with the first bank among the plurality of banks;

transmitting, in real time, an internal funds transfer instruction to the bank server thereby causing the bank server to transfer, via an intra-bank transfer at the first bank and without processing the transfer through a clearinghouse by issuing and activating an electronic bank card owned by the user, and loading, in real time, the electronic bank card owned by the user by transferring the funding amount from the first local managed services trust account to the account owned by the user;

receiving, in substantial real time, an indication of confirmation of an internal funds transfer from the bank server; and transmitting an internal funds transfer confirmation message to the user device, where the electronic bank card is accepted for immediate payment and settlement by participating merchants via their physical and internet-based point of sale devices.

* * * * *